United States Patent [19]
Andersson

[11] 3,965,640
[45] June 29, 1976

[54] FASTENER FOR SECURING A STRUCTURAL MEMBER TO CONCRETE

[76] Inventor: Erik Ingvar Andersson, Gotgatan 6, S-703 58 Orebro, Sweden

[22] Filed: Feb. 10, 1975

[21] Appl. No.: 548,814

Related U.S. Application Data

[63] Continuation of Ser. No. 413,675, Nov. 7, 1973, abandoned.

[30] Foreign Application Priority Data

Nov. 9, 1972    Sweden ............................ 14504/72

[52] U.S. Cl. .................................. 52/704; 52/714; 52/753 C; 85/19; 248/71
[51] Int. Cl.² ............................................. E04B 1/41
[58] Field of Search ............. 52/251, 698, 701, 704, 52/700, 714, 699, 361, 362, 363, 753 C, 753 G, 679–683; 403/231; 85/19; 248/216, 71

[56] References Cited
UNITED STATES PATENTS

| | | | |
|---|---|---|---|
| 905,414 | 12/1908 | Ette | 248/216 X |
| 1,318,823 | 10/1919 | Adolph | 52/753 C |
| 1,544,666 | 7/1925 | Lloyd | 52/753 C |
| 1,587,879 | 6/1926 | Voight | 52/681 |
| 1,971,726 | 8/1934 | Norwood | 52/698 X |
| 2,079,538 | 5/1937 | Wheeler et al. | 52/704 |
| 2,150,080 | 3/1939 | Rawlings | 85/83 |
| 2,219,197 | 10/1940 | Purtell | 85/19 |
| 3,201,906 | 8/1965 | Giardina | 52/698 X |
| 3,240,100 | 3/1966 | Rose | 85/19 |
| 3,298,645 | 1/1967 | Morris | 248/71 |
| 3,434,521 | 3/1969 | Flora | 85/83 X |
| 3,719,342 | 3/1973 | Kupersmit | 248/216 |

FOREIGN PATENTS OR APPLICATIONS

| | | | |
|---|---|---|---|
| 240,018 | 9/1964 | Austria | 52/704 |
| 1,442,937 | 5/1966 | France | 52/74 |
| 1,315,418 | 12/1962 | France | 85/83 |
| 1,065,905 | 9/1959 | Germany | 248/71 |
| 118,887 | 5/1947 | Sweden | 52/753 C |
| 381,841 | 11/1964 | Switzerland | 52/700 |

*Primary Examiner*—Ernest R. Purser
*Assistant Examiner*—Leslie A. Braun

[57] ABSTRACT

A fastener for anchoring a wall element to a concrete floor, or making a similar connection to concrete, comprises a pin portion and an integral head portion at one end of the pin portion. The pin portion has a cylindrical body and deformable radially projecting, axially extending ridges. The head portion has a flat surface parallel to the axis of the pin portion and a screw receiving hole through it, the axis of which is normal to said flat surface.

3 Claims, 6 Drawing Figures

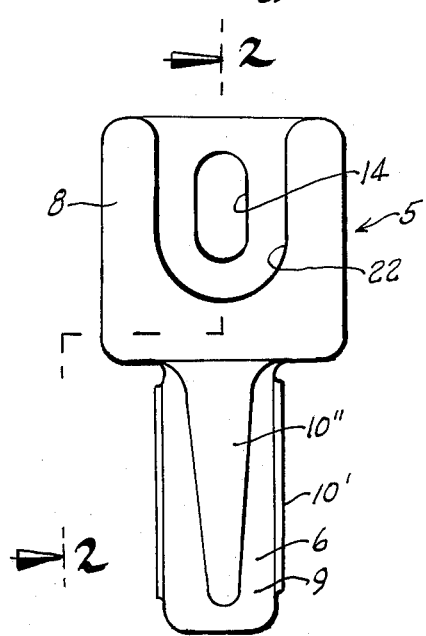
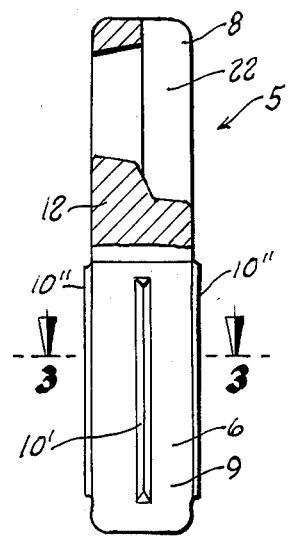
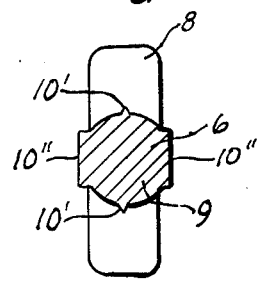
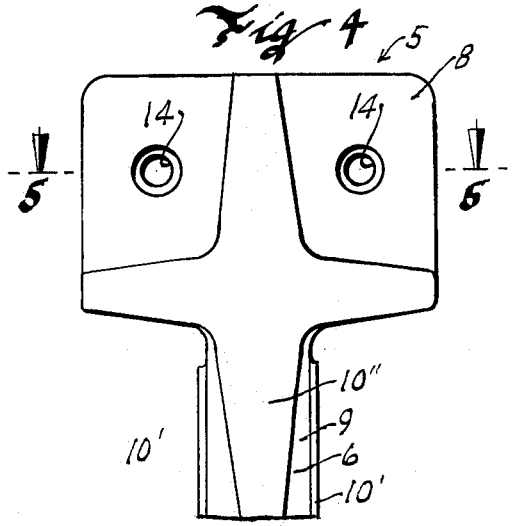
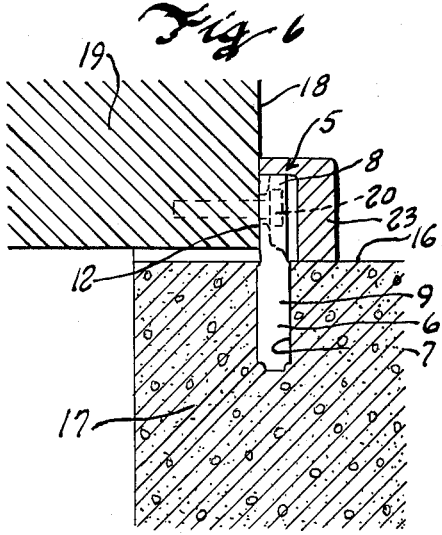
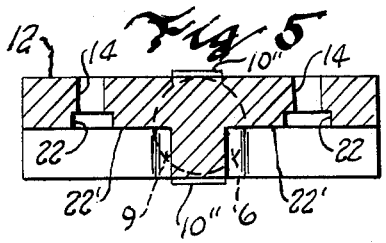

FASTENER FOR SECURING A STRUCTURAL MEMBER TO CONCRETE

This application is a continuation of my copending application Ser. No. 413,675, filed Nov. 7, 1973, now abandoned. This invention relates to fasteners for securing structural elements to concrete structure, and is more particularly concerned with a fastener that provides for securing to a concrete structural element, such as a floor, another structural element, such as a wall member, that has a surface normal to a surface of the concrete structural element.

When it was necessary to make a rigid connection to concrete structure of a building or the like, as for fastening a wall element to a concrete floor, the joint construction heretofore usually employed has comprised an angle iron secured to the concrete by means of expansion bolts. One leg of the angle iron flatwise overlay the surface of the concrete and had two or more expansion bolts passing through it and anchored into the concrete; the other leg of the angle iron flatwise overlay a surface of a structural member to be secured to the concrete and was fastened to that structural member by means of screws or the like.

Where such a joint was used to anchor a wall element to a concrete floor, for example, the joint was space consuming, inasmuch as the leg of the angle iron that overlay the concrete floor had to project laterally from a surface of the wall element. Because of the space it occupied, such a joint was also difficult to conceal with a skirt or a molding. In addition, such a joint was relatively expensive because of the comparatively large number of parts in it and the time and labor required for assembling the parts.

By contrast, the present invention has for its general object the provision of a fastener which can be anchored in a hole in a concrete floor or other concrete structural element, and which has a projecting portion directly secureable to another structural element that has a surface perpendicular to that of the concrete element, without the need for a further connecting structural member such as an angle iron.

Another object of this invention is to provide a fastener which can be quickly and securely anchored in a hole opening to a flat surface of a concrete structural element, and to which another structural element can be quickly and securely fastened, as by means of a screw or the like, with a surface of the other structural element abutting a flat surface on the fastener and extending perpendicular to said surface of the concrete structural element.

Another object of the invention is to provide a very simple, inexpensive and light-weight but sturdy fastener of the character described which can be quickly and easily installed in a hole in a concrete structural member and which is securely anchored to the structural member by such installation.

In general these objects of the invention are achieved by a fastener comprising a pin portion receivable in a hole in a concrete structural member and an integral head portion on one end of the pin portion and which is intended to be located outside the hole, the pin portion having a substantially cylindrical body with radially projecting axially extending integral ridges thereon that are adapted to be deformed by insertion of the pin portion into a hole, to wedgingly confine the pin portion in the hole, and the head portion having a flat surface which is parallel to the axis of the pin portion and against which a surface of another structural member can abut, the head portion also having a hole therethrough which has its axis transverse to said flat surface on the head portion and which can receive a screw or the like that secures said other structural member to the fastener.

With these observations and objectives in mind, the manner in which the invention achieves its purpose will be appreciated from the following description and the accompanying drawings, which exemplify the invention, it being understood that changes may be made in the specific apparatus disclosed herein without departing from the essentials of the invention set forth in the appended claims.

The accompanying drawings illustrate two complete examples of embodiments of the invention constructed according to the best modes so far devised for the practical application of the principles thereof, and in which:

FIG. 1 is a view in front elevation of a fastener embodying the principles of this invention;

FIG. 2 shows the fastener partly in side elevation and partly in longitudinal section on the plate of the line 2—2 in FIG. 1;

FIG. 3 is a view in cross-section taken on the plane of the line 3—3 in FIG. 2;

FIG. 4 is a view in front elevation of a modified embodiment of the invention;

FIG. 5 is a view in cross-section taken on the plane of the line 5—5 in FIG. 4; and FIG. 6 is a sectional view through a pair of structural members that are secured together by means of a fastener such as is illustrated in FIGS. 1–3.

Referring now to the accompanying drawings, the numeral 5 designated generally a fastener embodying the principles of this invention and which can be formed in one piece, of a suitable metal. In general, the fastener 5 has a pin portion 6 that is adapted to be received in a hole in a concrete structural element 7 and a head portion 8 that is outside the hole when the fastener is installed.

The pin portion 6 of the fastener has a generally cylidrical body 9 on which there are radially projecting, axially extending ridges 10. The cylindrical body 9 has a diameter slightly smaller than that of a hole in which the pin portion is intended to be received, but the ridges 10 project radially outwardly from the body a distance great enough so that they are deformed by forceful axial insertion of the pin portion into the hole. It will be understood that the metal of which the fastener is made will be soft enough to enable such deformation of the relatively small cross-section ridges 10, but will nevertheless be hard enough to support any shear stresses that may be imposed upon the fastener.

The ridges 10 are preferably symmetrically disposed relative to the axis of the pin portion so that as the latter is driven axially into a hole the ridges will tend to hold it concentric with the hole. As shown, the ridges comprise two relatively narrow lands 10' at diametrically opposite sides of the body and two wider ridges 10" that are also located diametrically opposite one another and centered at 90° circumferentially around the body from the narrow ridges 10'. At least the wider ridges 10" taper axially toward the end of the pin portion that is remote from the head portion. Preferably all of the ridges terminate short of said end of the pin portion, to facilitate starting the pin portion into a hole.

It will be evident that some degree of axial force will have to be exerted on the fastener to cause the ridges to be deformed by the surface of a hole as the pin portion is driven into it. Deformation of the ridges wedgingly anchors the fastener to the concrete; and with at least certain of the ridges tapered as above described, the wedging effect increases as the pin portion is driven farther into the hole. It will be evident that, concomitantly with this wedging effect, circumferentially spaced, axially elongated zones of radial compression are created in the body, and axial motion of the pin portion relative to the structural member having the hole is resisted by the reaction to this compression, transferred to the hole surface through the ridges.

The head portion 8 of the fastener has a flat surface 12 which is parallel to the axis of the pin portion and has at least one hole 14 therethrough, the axis of which is normal to said flat surface. In an installation of the fastener, as illustrated in FIG. 6, the flat surface 12 on the head portion is perpendicular to a surface 16 of a concrete structural member 17 in which the pin portion is received, and a surface 18 of another structural member 19 abuts said flat surface 12 on the fastener and is thus disposed perpendicular to the concrete surface 17. A screw 20 or the like extends through the hole 14 in the head to secure the structural member 17 to the fastener. Where there is only one screw hole 14 through the head, as shown in FIG. 1, it will of course be centered on the axis of the pin portion, and, as is also shown, it can be elongated in the direction of that axis.

Preferably the face of the head portion that is remote from its flat surface 12 has in it a recess or countersink 22 that is adapted to receive the head of the screw or other fastener 20 that extends through the hole 14 or each such hole. As shown in FIGS. 1–3 the recess 22 to which the single hole 14 opens has a more or less slot-like or U-shaped configuration, opening to the side of the head portion that is remote from the pin portion.

As shown in FIG. 6, a cove molding 23 of L-shaped cross-section can be installed to cover and conceal the head portions of holders of this invention and the screws or other fasteners that secure to them the structural element that they are to anchor.

The embodiment of this invention that is illustrated in FIGS. 4 and 5 is distinguished from that of FIGS. 1–3 mainly in that it has two holes 14 through its head portion, spaced equal distances to opposite sides of the axis of the pin portion, and has recesses 22' in its head portion to which said screw holes open that are of suitably different shape than the U-shaped recess shown in FIGS. 1–3. The embodiment of the invention shown in FIGS. 4 and 5 is mainly intended for securing wall elements of metal to a concrete floor or the like.

From the foregoing description taken with the accompanying drawings it will be apparent that this invention provides a very simple, compact, inexpensive and easily installed fastener by which a wall element or the like can be anchored to a concrete floor or other concrete structural element.

Those skilled in the art will appreciate that the invention can be embodied in forms other than as herein disclosed for purposes of illustration.

The invention is defined by the following claims:

I claim:

1. A securement device of the type having a substantially solid pin portion that can be driven into a hole in a structural member of concrete or the like and having a head portion at one end of said pin portion to which another structural member can be secured for anchorage to the first mentioned structural member, wherein the pin portion of said securement device is characterized by:
   A. an elongated substantially cylindrical body having a uniform radius along a substantial major portion of its length; and
   B. a plurality of circumferentially equidistant axially elongated ridges on said body, each said ridge
      1. extending lengthwise along said major portion of the length of the body,
      2. having a flat radially outermost surface which is normal to a plane containing the axis of the body and which, at its intersection with said plane, is at a uniform distance from said axis all along its length,
      3. being tapered to diminish in extent, as measured circumferentially of the body, from said one end of the pin portion, the opposite longitudinal edges of said flat surface thus being convergent towards one another and said plane in the direction away from said one end of the pin portion, and
      4. having other surfaces which extend lengthwise along said edges of said flat surface and which cooperate with said flat surface to define substantially square corners extending along said edges so that as the pin portion is driven progressively into a hole of a radius larger than that of said cylindrical body but smaller than that of the ridges, the corner portions of the ridges produce an increasing wedging effect upon the surface of the hole whereby circumferentially spaced, axially elongated zones of compression are created in the pin portion that resist its axial motion relative to the structural member having the hole.

2. A securement device of the type having a pin portion that can be driven into a hole in a structural member of concrete or the like and having a head portion at one end of said pin portion to which another structural member can be secured for anchorage to the first mentioned structural member, wherein the pin portion of said securement device is characterized by:
   A. a substantially cylindrical elongated solid body having a uniform radius along a substantial major portion of its length; and
   B. a plurality of circumferentially equidistant axially elongated ridges on said body, each said ridge
      1. extending lengthwise along said major portion of the length of the body,
      2. having a radially outermost surface which is substantially planar and which is at a uniform distance from the axis of the cylindrical body all along its longitudinally extending centerline,
      3. being tapered, as measured circumferentially of the body, from said one end of the pin portion so that the longitudinal edges of said substantially planar surface are convergent towards the other end of the pin portion, and
      4. having other surfaces which join said planar surface along said edges thereof at substantially sharp corners that extend lengthwise of the pin portion and are at decreasing distances from said axis with increasing distances from said one end of the pin portion, so that as the pin portion is driven progressively into a hole of a radius larger than that of the body but smaller than that of the ridges the corner portions of the ridges produce an increasing wedging effect upon the surface of the hole whereby circumferentially spaced, axially elongated zones of radial compression are created in the pin portion and axial motion thereof relative to the structural member having the hole is resisted.

3. The securement device of claim 2, further characterized by:

C. a plurality of other elongated ridges on the body, extending lengthwise therealong and circumferentially equidistant from the first mentioned ridges, each of said other ridges being untapered along its length but tapering radially outwardly substantially to an edge.

* * * * *